(12) United States Patent
Ordun et al.

(10) Patent No.: US 10,909,705 B2
(45) Date of Patent: Feb. 2, 2021

(54) SYSTEM AND METHOD FOR ASSESSING AN IMAGE SENTIMENT

(71) Applicant: Booz Allen Hamilton Inc., McLean, VA (US)

(72) Inventors: Catherine Ordun, Fairfax, VA (US); Andrea Blackwell, White Plains, MD (US); Jo Clark, Camarillo, CA (US); Erin Bradford, Arlington, VA (US); Nathan Schwan, Jamaica Plain, MA (US); Saba Ali, Gaithersburg, MD (US); Michael Joyce, Falls Church, VA (US); Nat Burgwyn, Washington, DC (US); Kevin Chiu, Gaithersburg, MD (US); Carver Sorensen, Arlington, VA (US); Michael Tong, Arlington, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 96 days.

(21) Appl. No.: 16/283,139

(22) Filed: Feb. 22, 2019

(65) Prior Publication Data

US 2020/0273189 A1 Aug. 27, 2020

(51) Int. Cl.
*G06T 7/564* (2017.01)
*G06T 7/00* (2017.01)
*G06K 9/00* (2006.01)

(52) U.S. Cl.
CPC .......... *G06T 7/564* (2017.01); *G06K 9/0063* (2013.01); *G06T 7/0004* (2013.01)

(58) Field of Classification Search
CPC ...... G06T 7/564; G06T 7/0004; G06K 9/0063
USPC ........................................................ 382/242
See application file for complete search history.

(56) References Cited

U.S. PATENT DOCUMENTS

| | | | |
|---|---|---|---|
| 2014/0077820 A1* | 3/2014 | Al-Ghannam | G01R 31/08 324/522 |
| 2015/0116665 A1* | 4/2015 | Finkel | A61B 3/112 351/210 |
| 2019/0355271 A1* | 11/2019 | Dawson | G09B 7/08 |
| 2020/0058038 A1* | 2/2020 | Hadas | G06K 9/00335 |
| 2020/0073485 A1* | 3/2020 | Al-Halah | G06N 20/00 |

FOREIGN PATENT DOCUMENTS

WO    WO 2018080536 A1 *  5/2018

OTHER PUBLICATIONS

Mittal, "Image Sentiment Analysis Using Deep Learning" 2018 IEEE/WIC/ACM International Conference on Web Intelligence (WI) Year: 2018.*

(Continued)

*Primary Examiner* — Juan A Torres
(74) *Attorney, Agent, or Firm* — Buchanan Ingersoll & Rooney PC (57) ABSTRACT

A computer-implemented method for assessing an image sentiment. The method can include receiving an image to identify a region of interest in the image; determining an image sentiment value associated with the image based on the region of interest, or a classification of the image; and displaying an indication of the image sentiment value with a spatial (e.g. geographical) location.

21 Claims, 7 Drawing Sheets
(5 of 7 Drawing Sheet(s) Filed in Color)

(56) References Cited

OTHER PUBLICATIONS

Katsurai, "Image sentiment analysis using latent correlations among visual, textual, and sentiment views" 2016 IEEE International Conference on Acoustics, Speech and Signal Processing (ICASSP) Year: 2016.*

Martinez, "Spatial-temporal characterization of an urban environment using Twitter" 2014 International Conference on Collaboration Technologies and Systems (CTS) Year: 2014.*

Linn, "Happy? Sad? Angry? This Microsoft tool recognizes emotions in pictures" Nov. 11, 2015.*

E. H. Crane, Ph.D. (Nov. 5, 2015), "Emergency Department Visits Involving Narcotic Pain Relievers" (United States of America, U.S. Department of Health and Human Services, Substance Abuse and Mental Health Services Administration), https://www.samhsa.gov/data/sites/default/files/report_2083/ShortReport-2083.html.

Runmin Cong et al, "Review of Visual Saliency Detection with Comprehensive Information", IEEE Transactions On Circuits and Systems for Video Technology, vol. XX, No. XX, XXXX 2018 https://arxiv.org/pdf/1803.03391.pdf.

Henryk Palus, "Colorfulness of the image: definition, computation and properties—art No. 615805", Silesian University of Technology, DOI: 10.1117/12.675760, Conference on Lightmetry and Light and Optics in Biomedicine, vol. 709, Jan. 2006 https://www.researchgate.net/publication/278101225.

* cited by examiner

Low Score / ~0.0

FIG. 3B

Medium Score / 0.33

FIG. 3C

High Score / 0.98

SYSTEM AND METHOD FOR ASSESSING AN IMAGE SENTIMENT

FIELD

The present disclosure relates to a system and method for assessing an image sentiment.

BACKGROUND INFORMATION

Environmental damage can include the emission of hazardous waste into the environment in the form of spills, dumps, litter, and other releases requiring cleanup that caused harm to humans or the environment. The geographic spread and severity of environmental damage can vary based on various factors.

Litter can also clog storm-water drains and other waterways to cause flooding. Food scraps and other organic items that are disposed of improperly can increase algal blooms in water, which reduces the amount of available oxygen for other aquatic life. Many beaches and rivers have been used as dumping grounds for trash which is detrimental to the environment and poses a serious challenge to the well-being of humans.

Similarly, unhygienic facilities in a medical facility and illicit online medical pharmacies pose a serious challenge to human well-being. Unhygienic facilities that fail to provide a sterile and clean environment can worsen patients' preexisting conditions, cause further illness, and even lead to dangerous and life-threatening infections. Illicit online medical pharmacies illegally sell prescription drugs to unauthorized users thus contributing to the opioid crisis.

Aspects of the present disclosure present technical solutions to address the previously described challenges.

SUMMARY

A computer-implemented method for assessing an image sentiment is disclosed. The method includes receiving an image to identify an object of interest in the image; determining an image sentiment value associated with the image based on the object of interest, or a classification of the image; and displaying an indication of the image sentiment value with a geographical location.

A system for assessing an image sentiment is disclosed. The system includes a receiving module configured to receive an image to identify a region of interest in the image; a determination module configured to determine an image sentiment value associated with the image based on the region of interest, or a classification of the image; and a display configured to display an indication of the image sentiment value with a spatial (e.g. geographical) location.

BRIEF DESCRIPTION OF THE DRAWINGS

The patent or application contains at least one drawing executed in color. Copies of this patent or patent application publication with color drawing(s) will be provided by the Office upon request and payment of the necessary fee.

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

Figure 1:
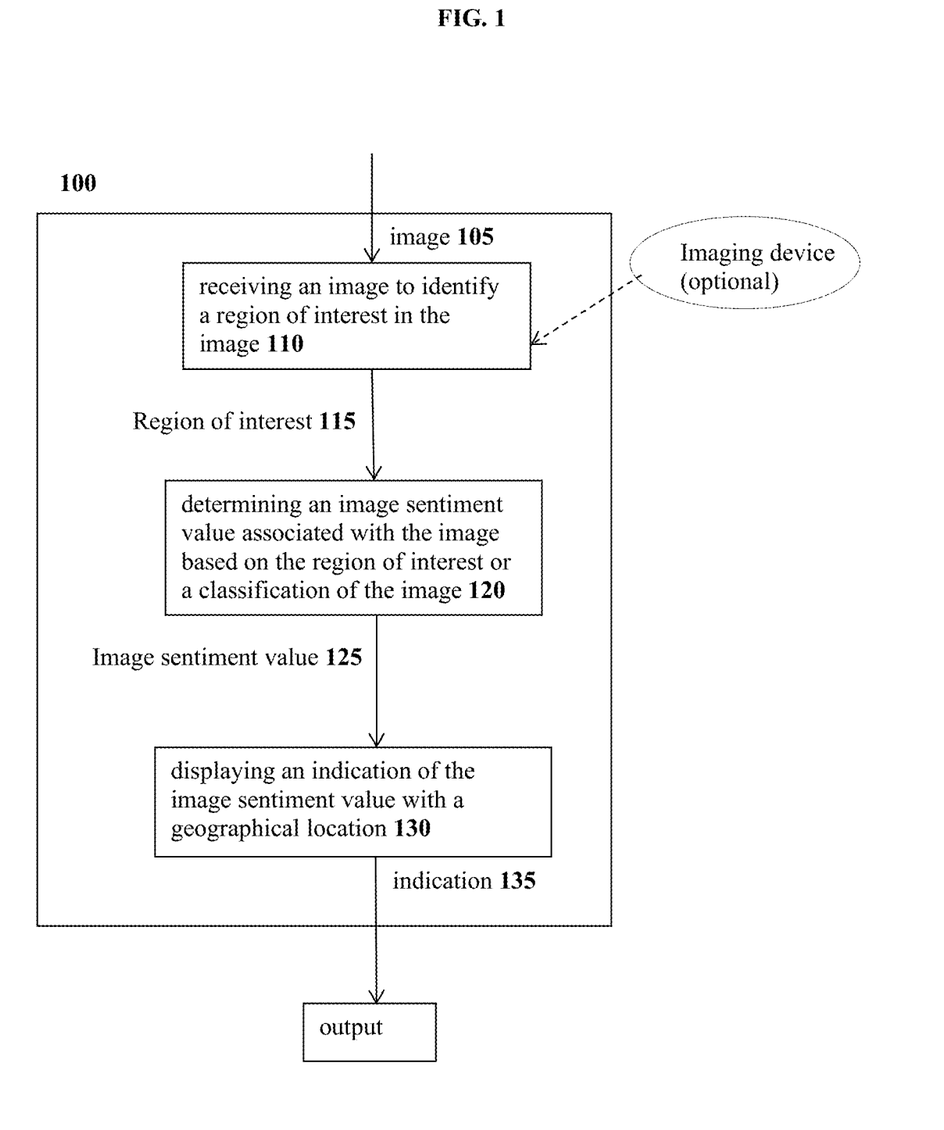
FIG. 1 illustrates an exemplary method for assessing an image sentiment.

FIG. 1 illustrates an exemplary flowchart for a computer-implemented method 100 for assessing an image sentiment of an image. As referred herein, an image "sentiment" refers to. for example, an intrinsic characteristic(s) of active content of a scene that has been imaged, including without limitation, any contact that can be associated with a perceived or assigned risk such as a risk to the health of living organisms. In addition, an analysis of an image sentiment can extract sentiments toward events or topics, such as those in image tweets, so that prediction of sentiment from visual content is complementary to textual sentiment analysis.

An image as described in the present disclosure can be a two-dimensional, such as a photograph or screen display, or three-dimensional, such as a statue or hologram. The image can be captured by optical devices—such as cameras, mirrors, lenses, telescopes, microscopes, etc. and natural objects and phenomena, such as the human eye or water. The image can be a two-dimensional figure such as a map, a graph, a pie chart, a painting or a banner. The image can be rendered manually, such as by drawing, the art of painting, carving, rendered automatically by printing or computer graphics technology, or developed by a combination of methods, in a pseudo-photograph.

In an exemplary embodiment, an image as described in the present disclosure can be a volatile image that exists only for a short period of time (e.g., on the order of milliseconds or lesser or greater). This may be a reflection of an object by a mirror, a projection of a camera obscura, or a scene displayed on a cathode ray tube. An image as described herein can be a fixed image, also called a hard copy that has been recorded on a material object, such as paper or textile by photography or any other digital or mechanical process. The subject of an image can be an abstract concept, such as a graph, function, or imaginary entity.

In an exemplary embodiment, an image can be a still image or a moving image. A still image can be a single static image. A still frame can be a still image derived from one frame of a moving one. A moving image can be a movie (film) or video, including digital video. It could also be an animated display such as a zoetrope, or any sequence of images whether they might change from image to image or not.

In an exemplary embodiment, the method 100 can include a step 110 of receiving an image 105 to identify a region of interest 115 in the image 105. The step 110 of receiving can include obtaining the image 105 from an imaging device. An imaging device as used herein can be an optical instrument to capture still images or to record moving images, which are stored in a physical medium such as in a digital system or on photographic film. The imaging device can be a camera that can include a lens which focuses light from the scene, and a camera body which holds the image capture mechanism. An imaging device as used herein can be a mobile phone with a camera which is able to capture photographs and often record video using one or more built-in digital cameras.

In an exemplary embodiment, the method 100 can include a step 120 of determining an image sentiment value 125 associated with the image 105 based on the region of interest 115 or a classification of the image 105. A region of interest (ROI) as used herein can be a region of an image identified for a particular purpose. In a 1D dataset, a ROI can be a time or frequency interval on a waveform. In a 2D dataset, a ROI can be boundaries of an object on an image. In a 3D dataset, a ROI can be the contours or surfaces outlining an object (sometimes known as the Volume of Interest (VOI)) in a volume. In a 4D dataset, a ROI can be the outline of an object at or during a particular time interval in a time-volume.

In an exemplary embodiment, to identify illicit opiate pharmacies, an image can be analyzed based on instances of opiates in the image. In this case, portions of the image with instances of opiates can be considered the ROI. Neural networks or CNNs such as Fast regional-CNN (r-CNN), Faster R-CNN, Mask R-CNN, and/or other neural network variations and implementations can be executed as computer vision driven object classification processes for identifying ROI.

In an exemplary embodiment, Mask R-CNN can encompass two components—a region proposal network (RPN) that can identify ROI (e.g., regions of an image that contain opiate instances) and output boxes/proposals to be examined by a classifier and regressor to eventually check the occurrence of objects (e.g., opiates). A conventional neural network (e.g., a pre-trained Resnet) can be used as a classifier that receives the output of the RPN. In an exemplary embodiment, the pre-trained Resnet can be trained on common opiate drugs, such as Fentanyl.

In an exemplary embodiment, the method 100 can include a step 130 of displaying an indication 135 of the image sentiment value 125 with a spatial (e.g. geographical) location. The indication 135 can be outputted in real time. Real-time can refer to a system that can provide responses within specified time constraints. The time-constraints can, for example, be of order of milliseconds or lesser or greater. A real-time system can control an environment by receiving data, processing them, and returning the results sufficiently quickly to permit actions to be taken to affect the environment at that time.

In an exemplary embodiment, the method 100 can include outputting an indication 135 of the image sentiment value 125 with a geographical location. The outputting can include generating a report, outputting information to a device, outputting on to a display, outputting to a printer, an artificial intelligence (AI) model, or any equivalents thereof.

In an exemplary embodiment, the indication 135 can be displayed on a graphical user interface (GUI). A GUI as used herein can be a form of user interface that allows users to interact with electronic devices through graphical icons and visual indicators such as secondary notation.

A user can select a type of imagery (e.g., opioids, littered waterways, unhygienic facilities) to be displayed, and a time frame of the imagery. The image sentiment value 125 can be color coded based on a severity of a risk shown by the imagery. For example, color red can be the most severe, whereas color white can be the least severe. The displaying can occur on a mobile phone screen, LCD screen, plasma screen, LED screen, DLP screen, CRT screen, printout etc.

Figure 2A:
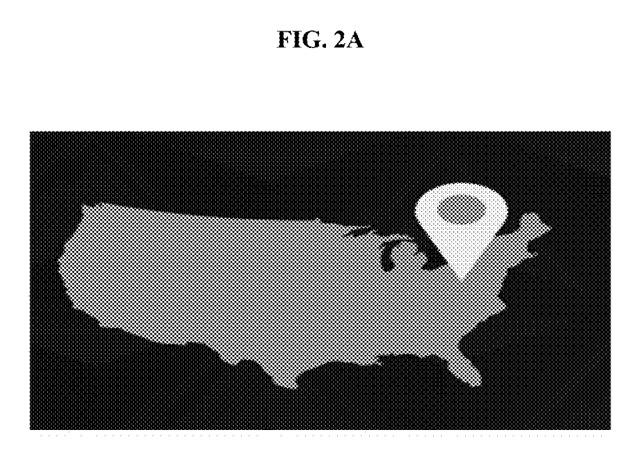
FIG. 2A illustrates an exemplary display of the image sentiment value with a geographical location.
Figure 2B:
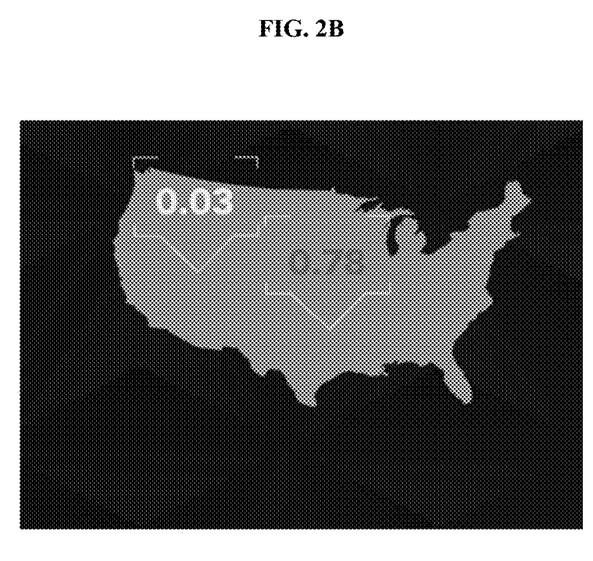
FIG. 2B illustrates an exemplary display of the image sentiment value based on a severity of risk.

FIG. 2A illustrates an exemplary displaying of the image sentiment value 125 with a geographical location on the map of United States of America. FIG. 2B illustrates an exemplary displaying of the image sentiment value 125 based on a severity of risk (colors red and white). In an exemplary embodiment, an image sentimental value can be illustrated on an image that shows both the geographical location and the severity.

In an exemplary embodiment, the method 100 can include assessing a health risk (e.g., misuse of opioids) using the image sentiment value 125. In an exemplary embodiment, the image sentiment value 125 can be determined based on at least an area of a bounding box that encloses the region of interest of the image 105. An exemplary formula for calculating the weighted score can be:

$$severity = \sum_{i=0}^{bounding\ box\ 10} \frac{dw_i * da_{in}}{100}$$

$$where, \begin{matrix} dw_i \text{ is the opiate lethality wieght,} \\ da_{in} \text{ in the bounding box area} \\ \text{(normalized to median box area in image),} \\ dw_0, da_{0n} = 0. \end{matrix}$$

Figure 3A:
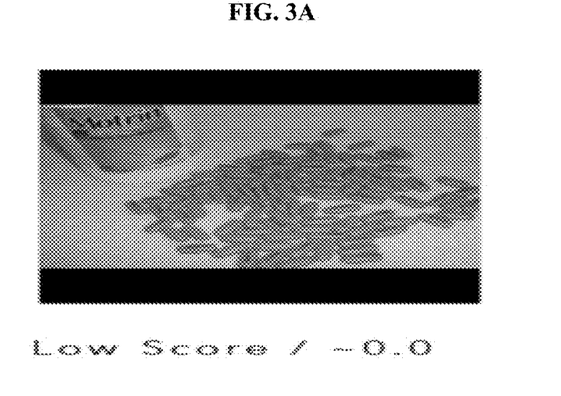
FIG. 3A illustrates an exemplary image of an opiate with a low severity score.
Figure 3B:
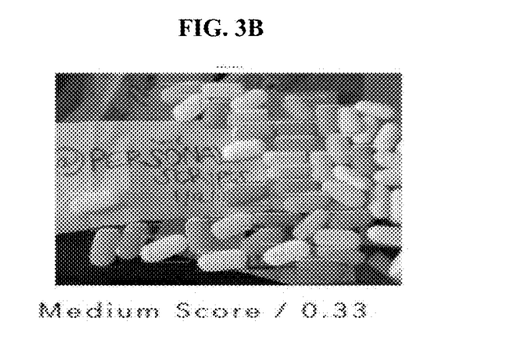
FIG. 3B is an exemplary image of exemplary bounding boxes over an opiate with a medium severity score.
Figure 3C:
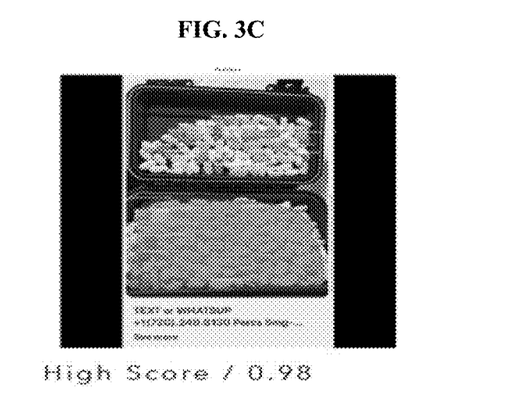
FIG. 3C is an exemplary image of exemplary bounding boxes over an opiate with a high severity score.

FIG. 3A is an exemplary image with a low severity score (~0.0) calculated using the previously described formula. In FIG. 3A, the opiate is Motrin that can be considered to have a ~0 opiate lethality weight. Therefore, severity calculation using the above formula is ~0. FIG. 3B is an exemplary image of hydro/oxycodone opiate that have a medium severity score (~0.33). FIG. 3C is an exemplary image of Fentanyl opiate with a high severity score (~0.98) calculated based on the previously described formula.

FIG. 3B and FIG. 3C illustrate exemplary bounding boxes enclosing the pills in the image. An area of the bounding box can be calculated by measuring the dimensions of a bounding box and applying a geometric formula (e.g., for a rectangular bounding box, multiplying the length and breadth of the box to obtain its area).

Figure 4:
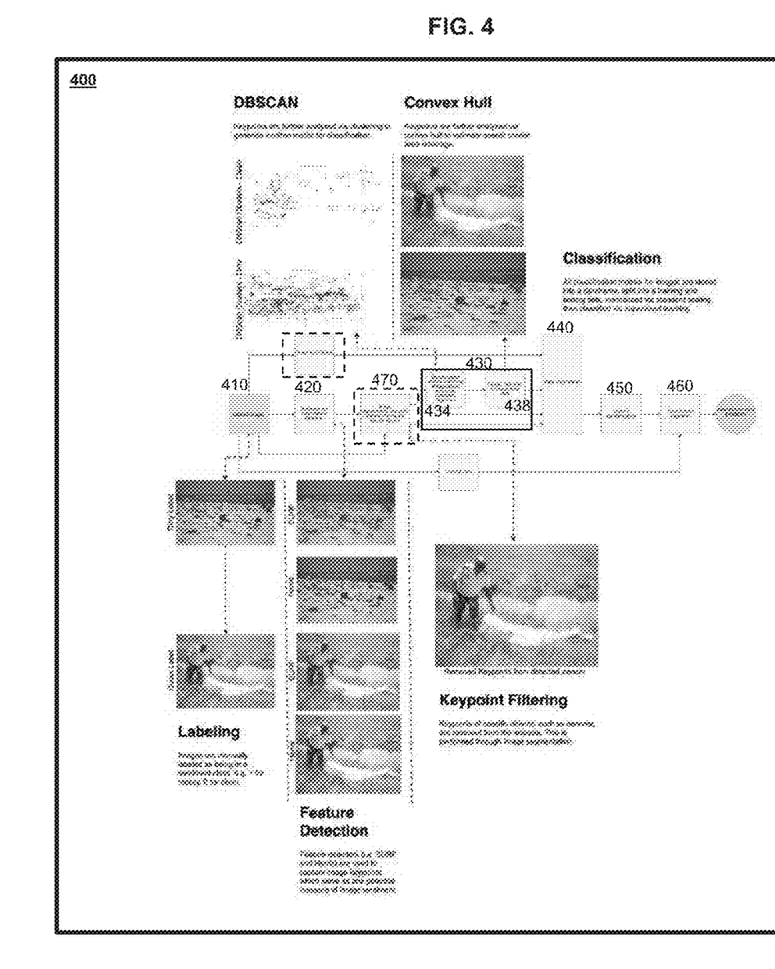
FIG. 4 illustrates an exemplary flowchart for a method for classification of an image.

The method 100 can include assessing an environmental risk (e.g., littered waterways, unhygienic facilities) using the image sentiment value 125 based on a classification of the image 105. FIG. 4 illustrates an exemplary method flowchart 400 for classification of the image 105 in the method 100. The flowchart 400 can include a step 410 of labeling the image 105 with a value between an upper limit and lower limit of a sentiment class (e.g., 1 for messy and 0 for clean).

In an exemplary embodiment, the colorfulness of the image 105 can be computed from digital image processing points of view, as referenced in the paper "Colorfulness of the image: definition, computation and properties—art. no. 615805" by Henryk Palus, incorporated here by reference.

In an exemplary embodiment, the flowchart 400 can include a step 420 of detecting a keypoint of the image 105 that indicates a measure of an image sentiment. A keypoint as used herein can have the following characteristics. It has a clear, preferably mathematically well-founded, definition. It has a well-defined position in image space. The local image structure around a keypoint can be rich in terms of local information contents (e.g.: significant 2D texture), such that the use of the keypoint can simplify further processing in the vision system. It is stable under local and global perturbations in the image domain as illumination/brightness variations, such that the keypoint can be reliably computed with high degree of repeatability. The notion of a keypoint can include an attribute of scale, to make it possible to compute interest points from real-life images as well as under scale changes.

Feature detection algorithms (e.g., SURF, Harris), or any equivalents thereof, can be used for detecting a keypoint of the image 105 by computing abstractions of image information and making local decisions at every image point whether there is an image feature of a given type at that point or not. The resulting features will be subsets of the image domain, often in the form of isolated points, continuous curves or connected regions. Various key detected by feature detection algorithms are shown in figures associated with step 420. The algorithms of Harris Corner Detector and SURF Dectector are incorporated by reference as disclosed in the book "Special Topics in Structural Dynamics, Volume 6: Proceedings of the 32nd IMAC, A Conference and Exposition on Structural Dynamics, 2014" by Gary Foss and Christopher Niezrecki.

In an exemplary embodiment, the step 420 can include extracting a first metric from the keypoint for classification of the image 105. The extracting the first metric can include generating the first metric via a statistical measurement, or any equivalents thereof, of the keypoint. The statistical measurement of the keypoint can include at least one of a number of keypoints, a standard deviation of the keypoint, or a mean of the keypoint. In such a case, the keypoint can be set of multiple keypoints. For example, if the image 105 has twenty five keypoints, then the first metric calculation can be based on at least that number, or other derived measurements.

In an exemplary embodiment, the flowchart 400 can include a step 430 of analyzing the keypoint to generate one or more additional metrics for classification of the image 105. The keypoint can be further analyzed to estimate overall area coverage. The additional metrics can be generated via clustering and/or convex hull techniques. Clustering 434 as used herein can be grouping a set of objects in such a way that objects in the same group (called a cluster) are more similar (in some sense) to each other than to those in other groups (clusters).

Density-based spatial clustering of applications with noise (DBSCAN) algorithm can be used for clustering. DBSCAN is a density-based clustering algorithm: given a set of points in some space, it groups together points that are closely packed together (points with many nearby neighbors), marking as outliers points that lie alone in low-density regions (whose nearest neighbors are too far away). Exemplary results obtained from DBSCAN clustering are shown in the images associated with 434.

A convex hull 438 as used herein can be the set of points forming the smallest convex set that includes all of the points. For example, the convex hull of two polygons can be considered the smallest single convex polygon that encloses the two polygons. Exemplary results obtained from convex hull are shown in the images associated with 438.

In an exemplary embodiment, the flowchart 400 can include a step 440 for storing/organizing the first metric and additional metrics in a database (e.g., a dataframe), which can be configured on different types of memory (e.g., RAM, ROM, EEPROM) including any computer-readable medium. The term "computer-readable medium" (or "machine-readable medium") as used herein is an extensible term that refers to any medium or any memory, that participates in providing instructions to a processor for execution, or any mechanism for storing or transmitting information in a form readable by a machine (e.g., a computer). Such a medium can store computer-executable instructions to be executed by a processing element and/or control logic, and data which is manipulated by a processing element and/or control logic, and can take many forms, including but not limited to, non-volatile medium, volatile medium, and transmission media.

In an exemplary embodiment, the flowchart 400 can include a step 450 for scaling and normalizing the stored metrics to generate a classifier. Feature scaling, or any equivalents thereof, can be used to standardize the range of independent variables or features of data. Various methods can be used for feature scaling. For example, min-max normalization can be used to rescale the range of features to scale the range in [0, 1] or [−1, 1]. Selecting the target range can depend on the nature of the data. For example, suppose that the stored metrics have a mean that spans between a value of 160 and 200. To rescale this data, 160 is subtracted from each mean and divide the result by 40 (the difference between the maximum and minimum mean).

In an exemplary embodiment, the flowchart 400 can include a step 460 for performing the classification of the image 105 via the classifier. Support-vector machines (SVMs), or any equivalents thereof, can be used for classification of the image. SVMs as described herein can be supervised learning models with associated learning algorithms that analyze data used for classification and regression analysis. Given a set of training examples, each marked as belonging to one or the other of two categories, an SVM training algorithm can build a model that assigns new examples to one category or the other, making it a non-probabilistic binary linear classifier. An SVM model can be a representation of the examples as points in space, mapped so that the examples of the separate categories are divided by a clear gap that is as wide as possible. New examples are then mapped into that same space and predicted to belong to a category based on which side of the gap they fall.

In an exemplary embodiment, the flowchart 400 can include a step 470 of segmenting the image 105 to filter an adverse keypoint associated with an obstruction object before the analyzing of the keypoint to generate additional metrics. For example, in a case of littering waterways, keypoints of specific objects, such as persons can be removed using image segmentation, as shown in the images associated with step 470. In an exemplary, step 470 can be optional in the flowchart 400.

In an exemplary embodiment, image segmentation as used herein can be a process of partitioning a digital image into multiple segments (e.g., sets of pixels, also known as super-pixels to simplify and/or change the representation of an image into something that is more meaningful and easier to analyze. Image segmentation can be used to locate objects and boundaries (lines, curves, etc.) in images by assigning a label to every pixel in an image such that pixels with the same label share certain characteristics.

Figure 5A:
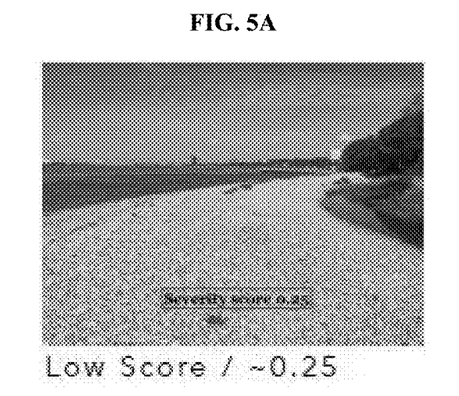
FIG. 5A illustrates an exemplary image of a littered waterway with a relatively low severity score (e.g., below that of FIG. 5B)
Figure 5B:
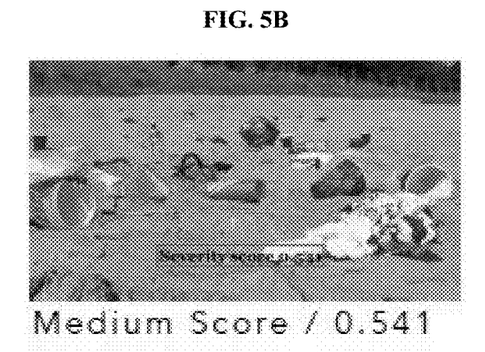
FIG. 5B illustrates an exemplary image of a littered waterway with a relatively medium severity score.
Figure 5C:
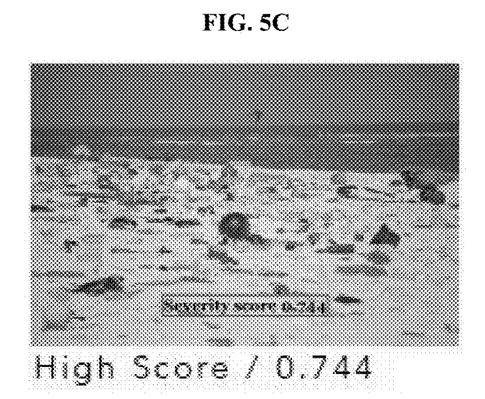
FIG. 5C illustrates an exemplary image of a littered waterway with a relatively high severity score (e.g., above that of FIG. 5B)

FIG. 5A is an exemplary image of a littered waterway with a low severity score (~0.0) calculated using the previously described method 400. FIG. 5B is an exemplary image of a littered waterway with a medium severity score (~0.541). FIG. 5C is an exemplary image of a littered waterway with a high severity score (~0.744).

Figure 6A:
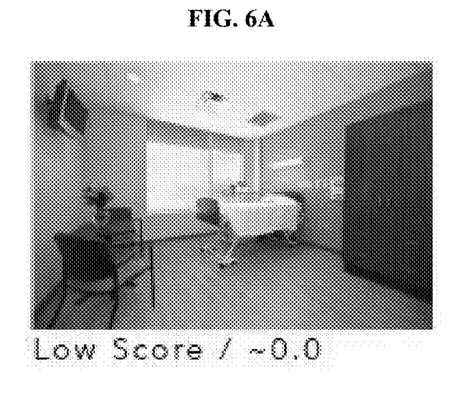
FIG. 6A illustrates an exemplary image of an unhygienic facility with a relatively low severity score (e.g., below that of FIG. 6B)
Figure 6B:
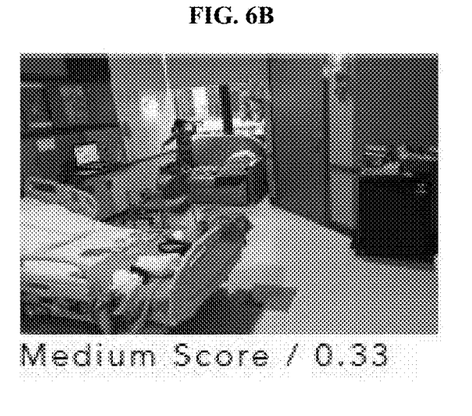
FIG. 6B is an exemplary image of an unhygienic facility with a relatively medium severity score.
Figure 6C:
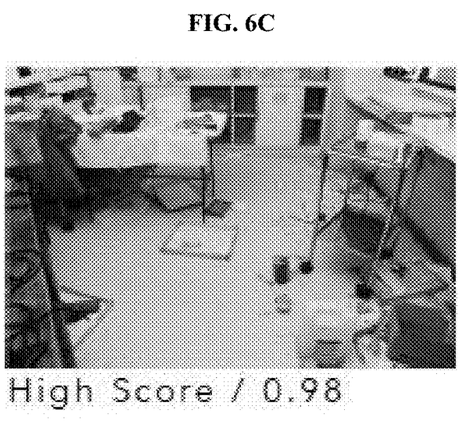
FIG. 6C is an exemplary image of an unhygienic facility with a relatively high severity score (e.g., above that of FIG. 6B)

FIG. 6A is an exemplary image of an unhygienic facility with a low severity score (~0.0) calculated using the previously described method 400. FIG. 6B is an exemplary image of an unhygienic facility with a medium severity score (~0.33). FIG. 6C is an exemplary image of an unhygienic facility with a high severity score (~0.98).

Figure 7:
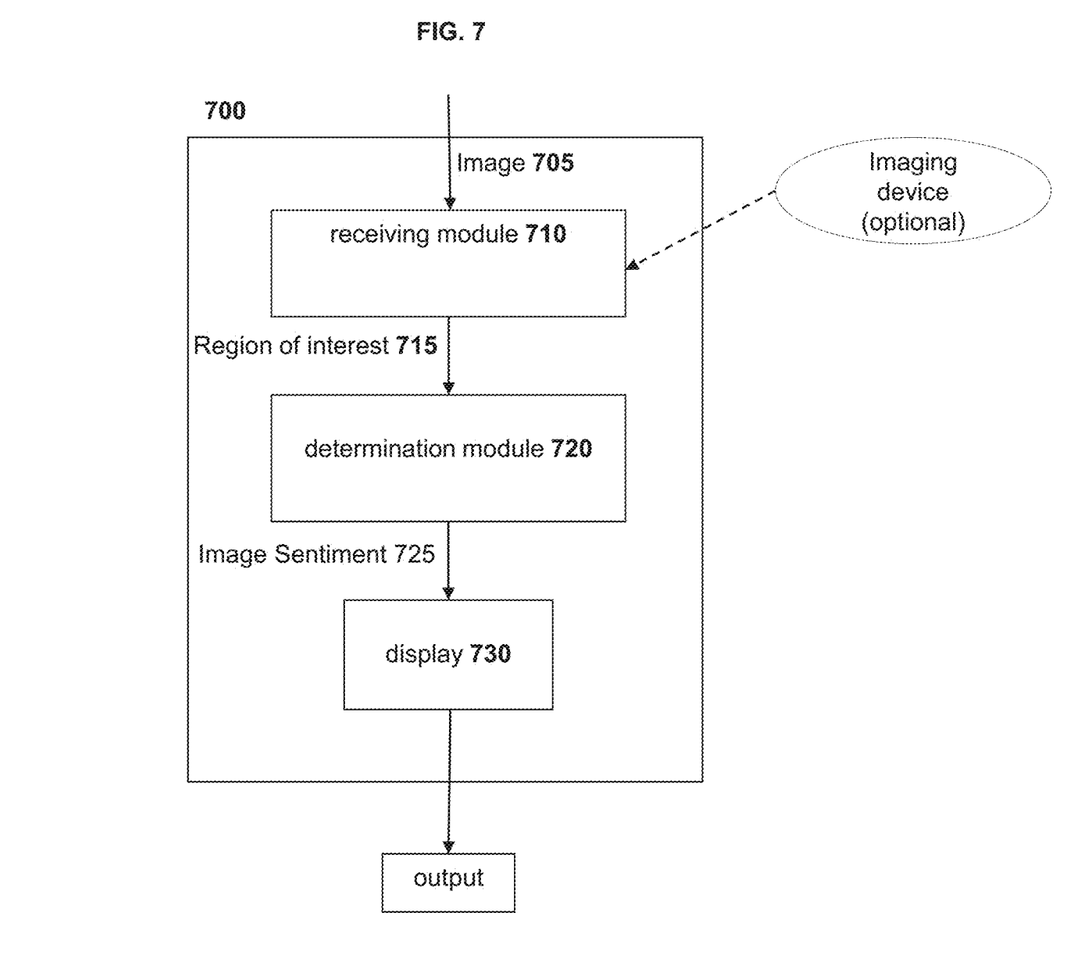
FIG. 7 is an exemplary system diagram for assessing an image sentiment.

FIG. 7 shows an exemplary system 700 for assessing an image sentiment value. In an exemplary embodiment, the system 700 can include a receiving module 710 configured to receive an image 705 to identify a region of interest 715 in the image 710 based on the previously described step 110 of the method 100.

In an exemplary embodiment, the system 700 can include a determination module 720 configured to determine an image sentiment value 725 associated with the image 705 based on the region of interest 715, or a classification of the image 705, as previously described in step 120.

In an exemplary embodiment, the system 700 can include a display 730 configured to display an indication of the image sentiment value 725 with a geographical location, as previously described in step 130.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable computing device to implement the present methods as discussed herein. In particular, the computer programs stored on a non-transitory computer-readable medium, when executed, can enable hardware processor device to implement the methods illustrated by FIGS. 2 and 4, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A computer-implemented method for assessing an image sentiment, the method comprising:

receiving an image to identify a region of interest in the image;

determining an image sentiment value associated with the image based on the region of interest, or a classification of the image, wherein the image sentiment value is an intrinsic characteristic of a scene in the image; and displaying an indication of the image sentiment value with a spatial location, wherein the spatial location is a geographical location of the scene.

2. The method of claim 1, comprising:

assessing a health risk using the image sentiment value.

3. The method of claim 1, wherein the image sentiment value is determined based on at least a weighted score of an area of a bounding box that encloses the region of interest.

4. The method of claim 1, wherein the receiving includes obtaining the image from an imaging device.

5. The method of claim 1, wherein the classification of the image comprises:

labeling the image with a value between an upper limit and lower limit;

detecting a keypoint of the image that indicates a measure of an image sentiment;

extracting a first metric from the keypoint for classification of the image;

analyzing the keypoint to generate one or more additional metrics for classification of the image;

storing the first metric and additional metrics;

scaling and normalizing the stored metrics to generate a classifier; and performing the classification of the image via the classifier.

6. The method of claim 2, wherein the health risk includes a misuse of opioids.

7. The method of claim 5, comprising:

assessing an environmental risk using the image sentiment value.

8. The method of claim 5, comprising:

segmenting the image to filter an adverse keypoint associated with an obstruction object before the analyzing of the keypoint to generate additional metrics.

9. The method of claim 5, wherein the extracting the first metric comprises:

generating the first metric via a statistical measurement of the keypoint.

10. The method of claim 5, comprising:

generating at least one of the additional metrics via clustering.

11. The method of claim 5, comprising:

generating at least one of the additional metrics via convex hull.

12. The method of claim 7, wherein the environmental risk includes littered waterways and/or unhygienic facilities.

13. The method of claim 9, wherein the statistical measurement of the keypoint includes at least one of a number of keypoint, a standard deviation of the keypoint, or a mean of the keypoint, wherein the keypoint is a set containing multiple keypoints.

14. A system for assessing an image sentiment, the system comprising:

a receiving module configured to receive an image to identify a region of interest in the image;

a determination module configured to determine an image sentiment value associated with the image based on the region of interest, or a classification of the image, wherein the image sentiment is an intrinsic characteristic of a scene in the image; and a display configured to display an indication of the image sentiment value with a spatial location, wherein the spatial location is a geographical location of the scene.

15. The system of claim 14, wherein the determination module is configured to determine the image sentiment value based on at least a weighted score of an area of a bounding box that encloses the region of interest.

16. The system of claim 14, comprising:

an imaging device configured to obtain an image.

17. The system of claim 14, comprising a classification module configured to:

label the image with a value between an upper limit and lower limit;

detect a keypoint of the image that indicates a measure of an image sentiment;

extract a first metric from the keypoint for classification of the image;

analyze the keypoint to generate one or more additional metrics for classification of the image;

store the first metric and additional metrics;

scale and normalize the stored metrics to generate a classifier; and perform the classification of the image via the classifier.

18. The system of claim 14 configured to assess a health risk using the image sentiment value.

19. The system of claim 14 configured to assess an environmental risk using the image sentiment value.

20. The system of claim 17, wherein the classification module is configured to segment the image to filter an adverse keypoint associated with an obstruction object before the analyzing of the keypoint to generate additional metrics.

21. A computer-implemented method for assessing an image sentiment, the method comprising:

receiving an image to identify a region of interest in the image;

determining an image sentiment value associated with the image based on the region of interest, or a classification of the image, wherein classification of the image includes:

labeling the image with a value between an upper limit and lower limit;

detecting a keypoint of the image that indicates a measure of an image sentiment;

extracting a first metric from the keypoint for classification of the image;

analyzing the keypoint to generate one or more additional metrics for classification of the image;

storing the first metric and additional metrics;

scaling and normalizing the stored metrics to generate a classifier, and performing the classification of the image via the classifier; and displaying an indication of the image sentiment value with a spatial location.

* * * * *